United States Patent [19]

Klauzs

[11] Patent Number: 4,827,492
[45] Date of Patent: May 2, 1989

[54] DIGITAL IMAGING SYSTEM WITH GREY SCALE SETTING, ESPECIALLY FOR THE DISPLAY OF BLOOD VESSELS

[75] Inventor: Remy Klauzs, Neuilly sur Seine, France

[73] Assignee: Thomson-CGR, Paris, France

[21] Appl. No.: 18,440

[22] Filed: Feb. 25, 1987

[30] Foreign Application Priority Data

Feb. 28, 1986 [FR] France ............... 86 02878

[51] Int. Cl.$^4$ .............................................. H05G 1/64
[52] U.S. Cl. ...................................... 378/99; 358/111
[58] Field of Search .................. 378/99, 901; 364/414; 382/6, 52, 53; 358/111

[56] References Cited

U.S. PATENT DOCUMENTS

| | | | |
|---|---|---|---|
| 4,204,225 | 5/1980 | Mistretta | 378/99 |
| 4,231,065 | 10/1980 | Fitch et al. | 358/166 |
| 4,438,495 | 5/1984 | Collins et al. | 382/6 |
| 4,595,949 | 6/1986 | Fenster et al. | 378/108 |
| 4,688,175 | 8/1987 | Kaneko et al. | 378/99 |

FOREIGN PATENT DOCUMENTS

2555003 5/1985 France .
2129635 5/1984 United Kingdom .

Primary Examiner—Craig E. Church
Assistant Examiner—John C. Freeman
Attorney, Agent, or Firm—Oblon, Fisher, Spivak, McClelland & Maier

[57] ABSTRACT

Digital imaging system wherein a digital value is assigned to each point or zone of the image, and this value is transformed in such a way that only a range or window of values representing luminances for a display device is selected. Control means are provided to modify the two parameters which characterize the window in the transforming device.

Since the system is designed to form images of one and the same category, for example X-rays of blood vessels, a pre-determined relationship is established between the two characteristic parameters of the window so that this window can be modified by actuating a single setting element.

3 Claims, 2 Drawing Sheets

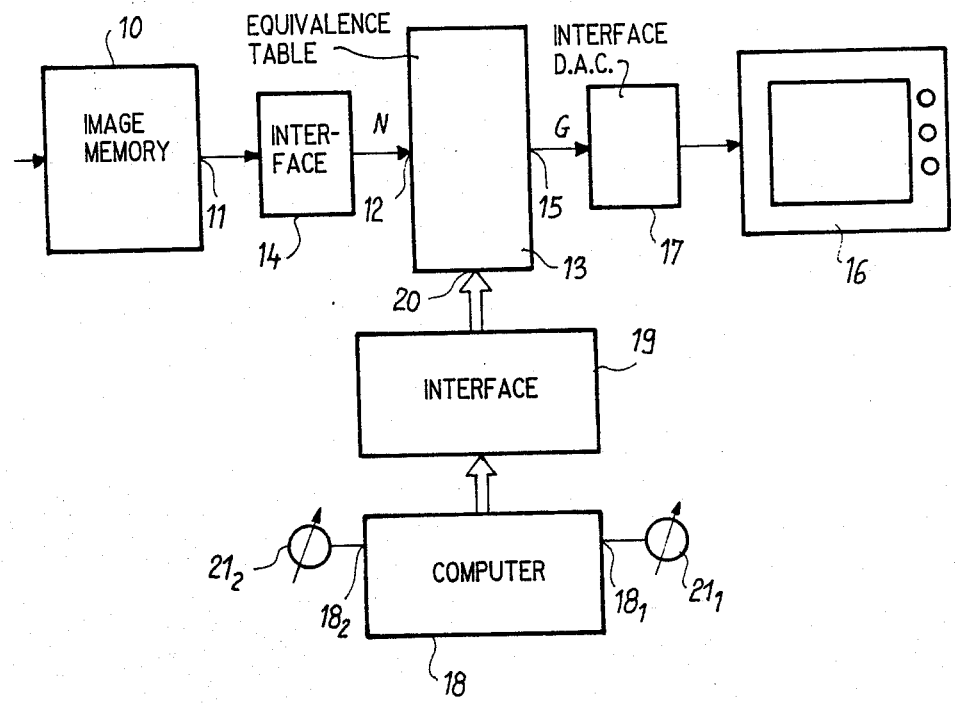
FIG_1
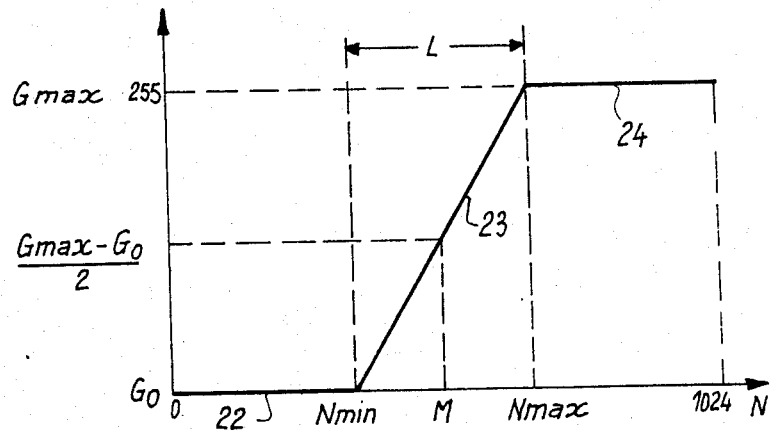
FIG_2

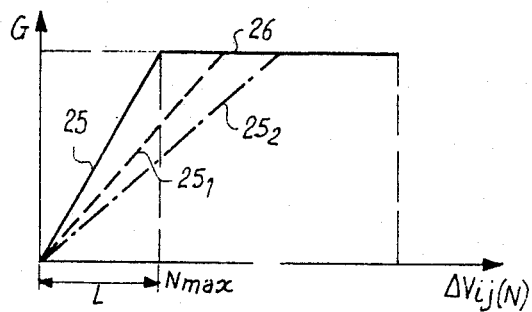
FIG_3-a
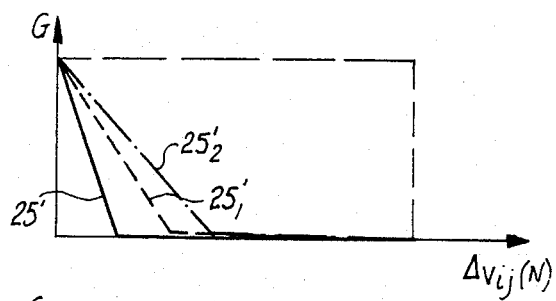
FIG_3-b
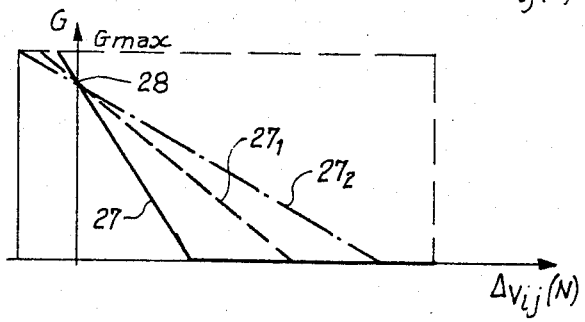
FIG_3-c
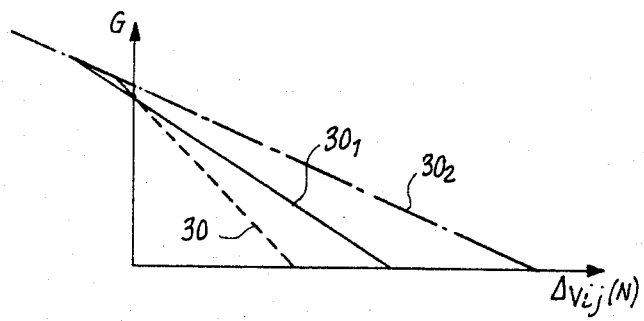
FIG_3-d
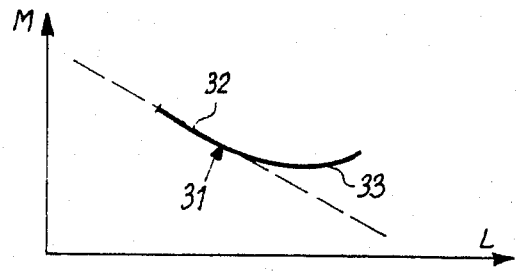
FIG_3-e

DIGITAL IMAGING SYSTEM WITH GREY SCALE SETTING, ESPECIALLY FOR THE DISPLAY OF BLOOD VESSELS

BACKGROUND OF THE INVENTION

Field of the Invention

The invention pertains to a system of digital imaging with grey scale setting, especially for the display of blood vessels.

In a digital imaging installation an image, most often an X-ray type of image, comprises points each of which has a digital value assigned to it, representing a radiation intensity. The digital value has a precision which is that of the measuring instruments. This precision is generally such that the said digital value can be represented by a binary number with 10, 11 or 12 bits.

Given that, in daytime (i.e. under the optimum conditions), the human eye is capable of distinguishing only about 1,000 different half-shades between dazzling white and absolute black provided, moreover, that these half-shades are located contiguously, a precision of 0.1% in the luminance is sufficient. But a cathode-ray tube can restore only 100 half-shades. Thus the luminance value assigned to each point during image reproduction is generally a binary number with a maximum of 8 bits (256 values possible) while the measuring instruments allow 10 to 12 bits.

In the reproduction of an image on a television screen, to benefit from all the precision of the digital image, an operation generally known as "window-making" is performed: in this operation, only brightness signal values between a minimum and a maximum are selected, the values between these limits being called a "window". The values of the digital signal which are outside the window correspond, on the one hand, to black (generally for values smaller than the lower limit) and on the other hand, to white (generally for values exceeding the upper limit of the window).

The window can usually be modified at will by the user depending on the object observed and on what he is seeking in this object. For example, to observe a human tissue by digital X-ray photography, one limit of the window corresponds to the highest absorption levels due to the bone while the other limit corresponds to the lowest absorption levels through the ambient air.

A window is defined by two parameters, most usually the width L and the mean level M. The width L of the window is the difference between the two limits while the mean level M is a value between these two limits which gives a value of grey determined on the display screen. The width L influences the contrast while the mean level M represents the luminosity of the image.

Window-arranging can be done by means of a random-access memory, called an equivalence table, receiving at its addressing input a signal representing the digital value of the radiation intensity at a point of the image and the content of the memory box which is at the corresponding address is transmitted to a television screen through a digital-analog converter. To modify the window, there is provision for computing means which modify the content of each box of the equivalence table according to the values of the two parameters which characterize the window. Hence, for each parameter, a setting means, such as a potentiometer, is associated with the computing means.

But the actuating of two commands is a constraint which users often consider to be a handicap.

SUMMARY OF THE INVENTION

The invention remedies this disadvantage.

It makes it possible, under certain conditions, to have only one control element for adjusting the window.

It results from the following observation: digital X-ray machines are most often designed for the observation of images of one and the same nature or one and the same category. For example an X-ray machine used to observe blood vessels (angiography) does not normally have any other use.

According to the invention, the two parameters defining the window are linked by a pre-determined relationship which depends on the nature of the image to be observed. Thus, it is enough to act on only one of the parameters to obtain a satisfactory setting (for the user's viewing) of the window.

BRIEF DESCRIPTION OF THE DRAWINGS

Other characteristics and advantages of the invention will appear from the description of certain of its modes of embodiment, the description being made with reference to the appended drawings wherein:

FIG. 1 is a diagram of a digital imaging installation designed for angiography,

FIG. 2 is a graph explaining the window-making operation and,

FIGS. 3a to 3e are other graphs illustrating the system according to the invention.

DESCRIPTION OF THE PREFERRED EMBODIMENT

In a digital X-ray installation, the X-ray image is digitalized, i.e. the picture is divided into a certain number of points or zones, and to each of these points is assigned a digital value representing a radiation intensity, this value being most often a binary number with 10 digits. The digitalized picture is stored in an image memory 10 and the various points are read in sequence by a television-type scanning operation, i.e. at the output 11 of this memory 10, the digital values at each point appear one after the other. These values are transmitted to the addressing input 12 of a random-access memory through an interface circuit 14.

The random-access memory 13 constitutes an equivalence table which performs the window-making operation, the signals which appear at the output 15 of this memory 13, or table of equivalence of greys, being applied to a television screen 16 through an analog-digital converter 17.

The content of the memory 13 can be modified by computing means 18 with two inputs $18_1$, $18_2$ for setting the parameters of the window, these computing means being connected, through an interface circuit 19, to the data inputs 20 of the memory 13 to change the content of each box of this memory. In other words, the digital value of each box of the memory 13 depends on the setting of two elements, such as potentiometers $21_1$ $21_2$ giving signals at the outputs, $18_1$ and $18_2$ respectively, of the computer These signals represent the two parameters defining the grey window as shall be seen below with respect to FIG. 2.

The x-axis of the graph of FIG. 2 gives the digitalized values N in the memory 10. In the example, these values range between 0 and 1024. The y-axis gives the values G appearing at the output 15 of the memory, or table, 13. These so-called grey values are binary numbers ranging between $G_0 = 0$ and $G_{max} = 255$.

The window-making done by means of the memory 13 consists in making the signal G at the output 15 follows the law of variations depicted by the straight line segments 22, 23 and 24.

The segment 22 is on the x-axis between the values 0 and $N_{min}$. The segment 24 is on a straight line parallel to the x-axis of the ordinate $G_{max}$ between the value $n_{max}$ (greater than $N_{min}$) and the maximum value of N, i.e. 1024. The segment 23 links the end of the abscissa $N_{min}$ of the segment 22 to the end of the abscissa $N_{max}$ of the segment 24.

It can be seen that window-making thus consists in considering luminance levels with values below $N_{min}$ as black and luminances with values above $N_{max}$ as white. Thus only one "window" of digital luminance values is chosen in the image which is in the memory 10, and this amplifies this window on the screen of the monitor 16. A window-making operation of this type can be used, especially if the window is adjustable, to observe details which, in practice, it would not be possible to observe if the entire scale of the values of the image digitalized were to be reproduced on the screen.

It will be easily understood that a window can be defined by two parameters, for example, $N_{min}$ and $N_{max}$, or again the width $L = N_{max} - N_{min}$ and the value M of the number N which gives a mean grey level, that is $(G_{max} - G_0)/2$, i.e. $G_{max}/2$ in the example. In the following part of the description, for both parameters, reference will be made only to the width L and the mean level M.

We shall now describe the invention in the context of subtractive, digital angiograhy.

Subtractive imaging consists in first making an initial image of the area of the patient to be observed (in this case, blood vessels) before injecting a contrast product, and then in making the same image after injecting the contrast product into the blood of the patient and finally, in subtracting, at each point, the digital value obtained with the contrast product from the digital value obtained without this product. It is also possible to establish the ratio between these two values.

At each point of the image, the digital value depends on the thickness crossed by the X-rays. More precisely, the attenuation increases with the length that is passed through. In the example, the number N represents this attenuation, more precisely the logarithm $\_V_{ij}$ of the ratio between the radiation intensity at each point of the image obtained with the contrast product and the intensity of the background (without contrast product).

A blood vessel may be likened to a cylinder. The X-rays cross this blood vessel perpendicular to the axis of the cylinder. The rays which are at a tangent to the cylinder provide no attenuation; for these rays, it is therefore possible to choose the value $N = 0$. However, the rays which pass through the axis of the cylinder travel over a very great length and are the most attenuated; For these points, the binary number of the digitalized image is $N_{max}$.

The above considerations result in the fact that the width L of the window to be used is all the greater as the blood vessel has a big diameter. Furthermore, this window has a fixed point, for example the origin on the x-axis N.

Thus, when blood vessels of various diameters (or cross-sections) are observed, it is enough to modify the width L of the window according to the diameter. In other words, a single parameter suffices to characterize the window.

FIG. 3a, which is a graph similar to that of FIG. 2, shows the segments 25 and 26 representing the window-making operation for a vessel with a relatively small diameter, while the segments $25_1$ with broken lines and $25_2$ with both types of lines correspond to the window-making operation for the observation of blood vessels with bigger cross-sections, the window corresponding to the segment $25_2$ pertaining to vessels with bigger cross-sections than those observed by means of the window depicted by the segment $25_1$. It is seen in this FIG. 3a that, to characterize the segment 25 (or $25_1$, $25_2$) only one parameter is enough, the width L or the value $N_{max}$ or again the slope of the segment 25. The mean level M is directly linked to this parameter. It suffices to act on only one of the adjusting means, for example that bearing the reference $21_1$, to modify the window.

FIG. 3a corresonds to light-coloured vessels on a black background. But it is generally preferred to obtain a complementary image, namely dark vessels on a light background. In the case of FIG. 3b, the background is white. This FIG. 3b depicts, as in FIG. 3a, segments 25', $25'_1$ and $25'_2$ corresponding to three windows of different widths.

If we use the method just described in relation with FIG. 3b, the background is saturated, and this might be disagreeable to the user. Furthermore, the resolution of the eye is in these conditions (saturated background) relatively poor for the observation of the blood vessels. This is why it is preferable for the background to be light grey and not white. The transformation of N into G, shown in FIG. 3c, might be adopted, i.e. the segments 27, $27_1$, $27_2$ representing the window would all pass through a determined point 28 of the y-axis, the ordinate of this point 28 being lower than $G_{max}$.

The studies conducted by the inventor have shown that it is possible to further improve the method of FIG. 3c, i.e. that it is possible to vary the window differently to the way shown in FIG. 3c to obtain a satisfactory visual relationship between the vessels and the light grey background. A "satisfactory visual relationship" here means sufficient contrast between the vessels and the background without loss of information by truncation, i.e. so that the small-diameter vessels remain visible.

The best result obtained by experiment is a transformation of the type shown in FIG. 3d where the segments 30, $30_1$, $30_2$ etc. representing windows do not all pass through a single point as is the case with FIG. 3c. However, as was already mentioned above, the window is always defined by a single parameter, i.e. there is always a pre-determined relationship between the mean level M and the width L of the window. This pre-determined relationship, which is empirically established, is represented by the curve 31 in FIG. 3e where the width L has been shown along the x-axis and the mean level M along the y-axis. This curve 31 has a part 32 which is substantially rectilinear and a part 33, towards the greater values of L, with an upward curving shape.

The curve 31, is for example, stored in the computer 18 during the construction of the device.

With a device of this type, it is possible to provide for only one setting element $21_1$. However, the element $21_2$ can be preserved to provide for a modification of the mean level M with a view to other applications.

I claim:

1. Digital imaging system wherein a first digital value is assigned to each point or zone of an X-ray image stored in a memory and each assigned value is transformed to a second digital value in such a way that only a range or window of said second digital values, representing luminances for a display image, are used in producing said display image, said imaging system comprising means to produce an x-ray image of an object, transforming means to transform said first digital value into said second digital value, control means for modifying two parameters which characterize the window produced by said transforming device, the parameters of the window concern a width of said window and a mean level said control means further comprises computer means, said computer means has a storage means for storing a curve representing a pre-determined non-linear relationship between said width of said window and said mean level of said window, said curve being linear for a first range of small width values and being upwardly-curved for a second range of width values larger than said first range of small width values.

said control means modifies said parameters of said window in accordance with said curve by actuating a single setting element while maintaining satisfactory visibility of said displayed x-ray image.

2. Digital imaging system according to claim 1, wherein said transforming device comprises a random-access memory, said random-access memory comprising an addressing input and a data input, said addressing input receives said first digital values of said x-ray image, said data input is connected to said computer means, and said computer means further comprises an input which receives a signal from said setting element representative of a parameter of said window.

3. System according to claim 1, wherein the parameters representing the window are expressed in terms of a minimum level and a maximum level.

* * * * *